United States Patent
Putti et al.

(10) Patent No.: US 12,223,174 B2
(45) Date of Patent: Feb. 11, 2025

(54) MODULATING CREDIT ALLOCATIONS IN MEMORY SUBSYSTEMS

(71) Applicant: Google LLC, Mountain View, CA (US)

(72) Inventors: Nagaraj Ashok Putti, Bangalore (IN); Abhra Bagchi, Bangalore (IN); Vyagrheswarudu Durga Nainala, Bangalore (IN); Venkateswaran Ananthanarayanan, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/250,476

(22) PCT Filed: Oct. 26, 2020

(86) PCT No.: PCT/US2020/057293
§ 371 (c)(1),
(2) Date: Apr. 25, 2023

(87) PCT Pub. No.: WO2022/093165
PCT Pub. Date: May 5, 2022

(65) Prior Publication Data
US 2024/0004551 A1    Jan. 4, 2024

(51) Int. Cl.
G06F 3/06    (2006.01)
(52) U.S. Cl.
CPC .......... *G06F 3/0613* (2013.01); *G06F 3/0631* (2013.01); *G06F 3/0673* (2013.01); *G06F 3/0683* (2013.01)
(58) Field of Classification Search
CPC .... G06F 3/0613; G06F 3/0631; G06F 3/0673; G06F 11/3037; G06F 13/1663; G06F 13/1673
See application file for complete search history.

(56) References Cited

U.S. PATENT DOCUMENTS 7,660,247 B2    2/2010    Beukema et al.
10,054,451 B2 *  8/2018    Xue ................... G01C 21/3641
(Continued)

FOREIGN PATENT DOCUMENTS

EP    2431884       3/2012
KR    20080026898   3/2008
(Continued)

OTHER PUBLICATIONS

Microsoft, "Computer Dictionary", 5th Edition, 2002, pp. 326, 419, 437-438 (Year: 2002).*

(Continued)

*Primary Examiner* — Christopher D Birkhimer
(74) *Attorney, Agent, or Firm* — Colby Nipper PLLC

(57) ABSTRACT

This document describes systems and techniques for modulating credit allocations in memory subsystems. The described systems and techniques can provide a feedback mechanism to a credit controller to improve the bandwidth at a memory interface. The memory controller monitors statistics associated with transaction requests served to one or more random access memories (RAMs) of the memory subsystem. The memory controller can then provide suggestions to the credit controller or to the one or more clients to modulate the number of credits allocated to one or more clients. In this way, the described systems and techniques can improve the efficiency of the memory controller in managing the transaction requests and the bandwidth at the memory interface.

20 Claims, 6 Drawing Sheets

(56) References Cited

U.S. PATENT DOCUMENTS

| | | | |
|---|---|---|---|
| 2005/0254519 | A1 | 11/2005 | Beukema et al. |
| 2014/0289439 | A1* | 9/2014 | Mangano ................. G06F 13/14 |
| | | | 710/306 |
| 2015/0199134 | A1 | 7/2015 | Mondal et al. |
| 2015/0293709 | A1 | 10/2015 | Quach et al. |
| 2017/0192921 | A1* | 7/2017 | Wang ..................... G06F 9/3004 |
| 2017/0254650 | A1* | 9/2017 | Xue ..................... G01C 21/3641 |
| 2019/0196720 | A1* | 6/2019 | Shen ..................... G06F 3/0653 |
| 2019/0370073 | A1* | 12/2019 | Behar ..................... G06F 3/0659 |

FOREIGN PATENT DOCUMENTS

| | | |
|---|---|---|
| TW | 201439771 | 10/2014 |
| TW | 201539196 | 10/2015 |
| TW | 201812565 | 4/2018 |
| WO | 2016099819 | 6/2016 |
| WO | 2022093165 | 5/2022 |

OTHER PUBLICATIONS

JEDEC Solid State Technology Association, "JESD209-2F", Jun. 2013, pp. 1-284 (Year: 2013).*

Anonymous, "7 ASIC Integration Benefits", Feb. 4, 2019, pp. 1-5, https://sigenics.com/blog/7-asic-integration-benefits (Year: 2019).*

Wikipedia, "LPDDR", Oct. 11, 2019, pp. 1-10, https://en.wikipedia.org/w/index.php?title=LPDDR&oldid=920709630 (Year: 2019).*

Anonymous, "Samsung LPDDR3 High-Performance Memory Enables Amazing Mobile Device in 2013, 2014", Jun. 27, 2012, pp. 1-3, https://brightsideofnews.com/blog/samsung-lpddr3-high-performance-memory-enables-amazing-mobile-devices-in-20132c-2014/ (Year: 2013).*

"Foreign Office Action", TW Application No. 111139575, Apr. 24, 2023, 8 pages.

"International Preliminary Report on Patentability", Application No. PCT/US2020/057293, May 2, 2023, 11 pages.

"International Search Report and Written Opinion", PCT Application No. PCT/US2020/057293, Aug. 19, 2021, 16 pages.

Thyagarajan, et al., "A Performance Architecture Exploration and Analysis Platform for Memory Sub-Systems", Accessed online at: https://www.design-reuse.com/articles/30944/a-performance-architecture-exploration-and-analysis-platform-for-memory-sub-systems.html on Jul. 30, 2020.

"Foreign Office Action", CN Application No. 202080106350.X, Sep. 25, 2024, 13 pages.

* cited by examiner

MODULATING CREDIT ALLOCATIONS IN MEMORY SUBSYSTEMS

RELATED APPLICATION(S)

This application is a national stage entry of International Application No. PCT/US2020/057293, filed Oct. 26, 2020, the disclosure of which is incorporated herein by reference in its entirety.

BACKGROUND

Memory controllers in systems on chips (SoCs) can include a buffer to temporarily store transactions before sending them to memory. The buffer allows a memory controller to schedule the transactions and maximize the bandwidth of an interface to the memory. To further manage the bandwidth, memory controllers often subdivide the buffer into credits. The SoC can allocate, based on a desired or required quality of service (QoS) for clients accessing the memory, the credits to the clients or different traffic classes of the clients. The number of credits, allocated to a traffic class, however, is generally static and may not maximize the bandwidth at the memory interface based on actual transaction traffic at the memory.

SUMMARY

This document describes systems and techniques for modulating credit allocations in memory subsystems. The described systems and techniques can provide a feedback mechanism to a credit controller or one or more clients of a memory subsystem to improve the bandwidth at a memory interface. The memory controller monitors statistics associated with transaction requests served to one or more random access memories (RAMs) of the memory subsystem. The memory controller can then provide suggestions to the credit controller or the one or more clients to modulate the number of credits allocated to one or more clients with access to the RAMs. In this way, the described systems and techniques can improve the efficiency of the memory controller in managing the transaction requests and the bandwidth at the memory interface.

For example, a memory subsystem of a system on chip (SoC) includes a credit controller and a memory controller. The credit controller allocates a respective number of credits to one or more clients of the memory subsystem. The memory controller is operably connected to one or more RAMs. The memory controller includes a buffer, which can store transaction requests from the clients to access data in the RAMs. The memory controller can monitor, for each client, statistics of the transaction requests served by the memory controller and generate, based on the statistics, a signal to indicate to the credit controller to modulate the respective number of credits allocated to at least one of the clients.

This document also describes other methods, configurations, and systems for modulating credit allocations in memory subsystems.

This Summary is provided to introduce simplified concepts for modulating credit allocations in memory subsystems, which is further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of modulating credit allocations in memory subsystems are described in this document with reference to the following drawings. The same numbers are used throughout multiple drawings to reference like features and components.

DETAILED DESCRIPTION

Overview

Figure 1:
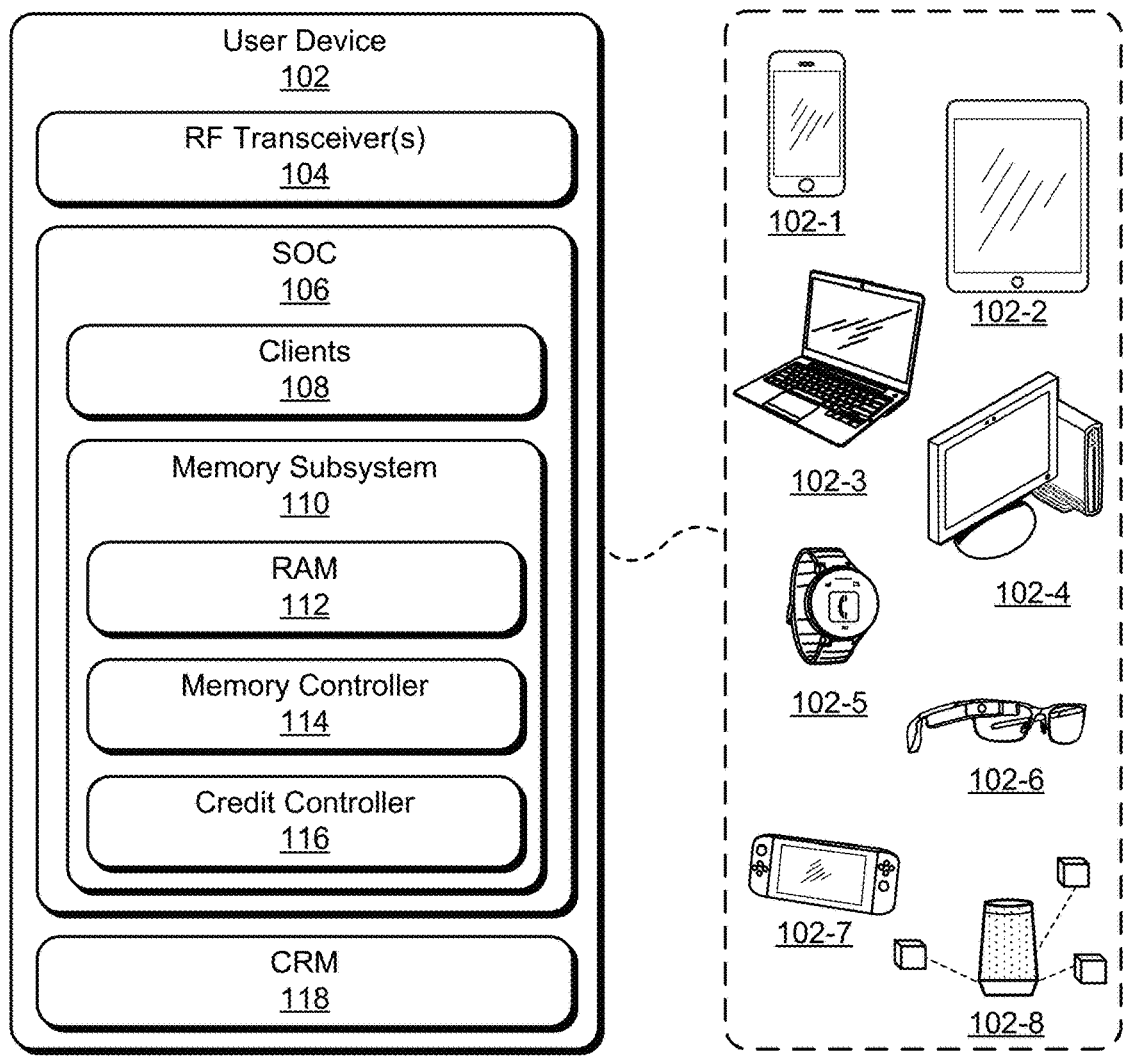
FIG. 1 illustrates an example device diagram of a user device in which systems and techniques for modulating credit allocations in a memory subsystem can be implemented.

This document describes systems and techniques to modulate credit allocations in memory subsystems. Memory controllers in SoCs can subdivide an internal buffer into credits. A credit controller can allocate the credits to different clients or traffic classes of clients. In this way, the memory controller can allocate its buffer and schedule transactions to maximize bandwidth at a memory interface.

Memory subsystems can define a traffic class as a set of memory transactions that require a particular treatment to guarantee a certain quality of service (QoS) or obtain a particular system performance. The SoC or credit controller can allocate a different virtual channel identification (VCID) to each traffic class to simplify the credit allocation.

Existing memory controllers may include a relatively large buffer to improve efficiencies in serving transactions to the memory and improve the bandwidth at the memory interface. These memory subsystems generally statically allocate the number of credits assigned to the clients and traffic classes. Such memory subsystems, however, are not able to dynamically adjust the allocated credits to improve the bandwidth at the memory interface in response to actual memory transactions.

In contrast, the described systems and techniques modulate credit allocations to clients, traffic classes, or VCIDs based on real-time statistics of served transactions. In this way, the described systems and techniques can suggest modulation of the allocated credits. The memory controller can also provide a closed-feedback mechanism to a credit controller, or at least some clients, to enable efficient management and delivery of transaction requests. As a result, the described systems and techniques can increase the bandwidth at the memory interface.

As a non-limiting example, a memory subsystem of an SoC includes a credit controller and a memory controller. The credit controller can allocate a respective number of credits to one or more clients. The memory controller is operably connected to one or more RAMs and the credit controller. The memory controller also includes a buffer that can store transaction requests from the clients to access data in the RAMs. The memory controller can monitor, for each client of the one or more clients, statistics of the transaction requests served by the memory controller. The memory controller can then determine, based on the statistics, whether memory throughput would be increased by increasing or decreasing a respective number of credits allocated to at least one client of the one or more clients. The memory controller can generate, based on a determination that the memory throughput would be increased, an output signal. The output signal can indicate to the credit controller that the respective number of credits allocated to the at least one client should be increased or decreased.

This example is just one illustration of modulating credit allocations in memory subsystems to improve the bandwidth at a memory interface. Other example configurations and methods are described throughout this document. This document now describes additional example methods, configurations, and components for the described modulation of credit allocations in memory subsystems.

Example Devices

FIG. 1 illustrates an example device diagram 100 of a user device 102 in which systems and techniques for modulating credit allocations in a memory subsystem can be implemented. The user device 102 may include additional components and interfaces omitted from FIG. 1 for the sake of clarity.

The user device 102 can be a variety of consumer electronic devices. As non-limiting examples, the user device 102 can be a mobile phone 102-1, a tablet device 102-2, a laptop computer 102-3, a desktop computer 102-4, a computerized watch 102-5, a wearable computer 102-6, a video game console 102-7, or a voice-assistant system 102-8.

The user device 102 can include one or more radio frequency (RF) transceivers 104 for communicating over wireless networks. The user device 102 can tune the RF transceivers 104 and supporting circuitry (e.g., antennas, front-end modules, amplifiers) to one or more frequency bands defined by various communication standards.

The user device 102 also includes the SoC 106. The SoC 106 generally integrates several components of the user device 102 into a single chip, including a central processing unit, memory, and input and output ports. The SoC 106 can include a single core or multiple cores. In the depicted implementation, the SoC 106 includes one or more clients 108 and a memory subsystem 110. The SoC 106 can include other components, including communication units (e.g., modems), input/output controllers, and system interfaces.

The clients 108 provide transaction requests to read or write data to random access memory (RAM) 112 of the memory subsystem 110. The clients 108 can include, as non-limiting examples, a display system, a graphics processing unit, a central processing unit, a communication unit, input/output controllers, and system interfaces of the SoC 106.

The memory subsystem 110 includes the RAM 112, a memory controller 114, and a credit controller 116. The RAM 112 is a suitable storage device (e.g., static RAM (SRAM), dynamic RAM (DRAM), non-volatile RAM (NVRAM), synchronous dynamic RAM (SDRAM)) to store data accessible by the clients 108. In other implementations, the RAM 112 can be located outside the SoC 106.

The memory controller 114 manages the transaction requests of the clients 108 to the RAM 112. The memory controller 114 can buffer and serve the transaction requests to the RAM 112 to increase the bandwidth of the memory subsystem 110. In particular, the memory controller can schedule the transaction requests to improve the bandwidth of an interface between the RAM 112 and the memory controller 114. The memory controller 114 can include hardware, firmware, software, or a combination thereof.

The credit controller 116 can allocate a portion of the buffer in the memory controller 114 to the clients 108. The allocated portion of the buffer (referred to in this document as "credits") represents a bandwidth guarantee for the respective clients 108 at the RAM 112. The credit controller 116 can include hardware, firmware, software, or a combination thereof.

A fabric (not illustrated in FIG. 1) is operably connected to the clients 108 via respective virtual channels. The fabric can forward the transaction requests from the clients 108 to the memory controller 114. In some implementations, the fabric is a multiplexer. The credit controller 116 can be implemented in the fabric, in any or all of the clients 108, as a stand-alone component in the SoC 106, or as a stand-alone component outside of the SoC 106.

The memory controller 114 can also monitor statistics related to transactions served to the RAM 112. Based on the statistics, the memory controller 114 can provide feedback to the credit controller 116 and/or the clients 108 to potentially modulate (e.g., decrease, increase, maintain) the credits allocated to one or more of the clients 108. In this way, the described systems and techniques can dynamically modulate the credit allocations among the clients 108 and improve the QoS for the clients 108.

The user device 102 also includes computer-readable storage media (CRM) 118. The CRM 118 is a suitable storage device (e.g., random-access memory (RAM), static RAM (SRAM), dynamic RAM (DRAM), non-volatile RAM (NVRAM), read-only memory (ROM), Flash memory) to store device data of the user device 102. The device data can include an operating system, one or more applications, user data, and multimedia data. In other implementations, the CRM 118 can store the operating system and a subset of the applications, user data, and multimedia data of the SoC 106.

The operating system generally manages hardware and software resources of the user device 102 and provides common services. The operating system and the applications are generally executable by the SoC 106 to enable communications and user interaction with the user device 102, which may require accessing data in the RAM 112 of the memory subsystem 110.

Figure 2:
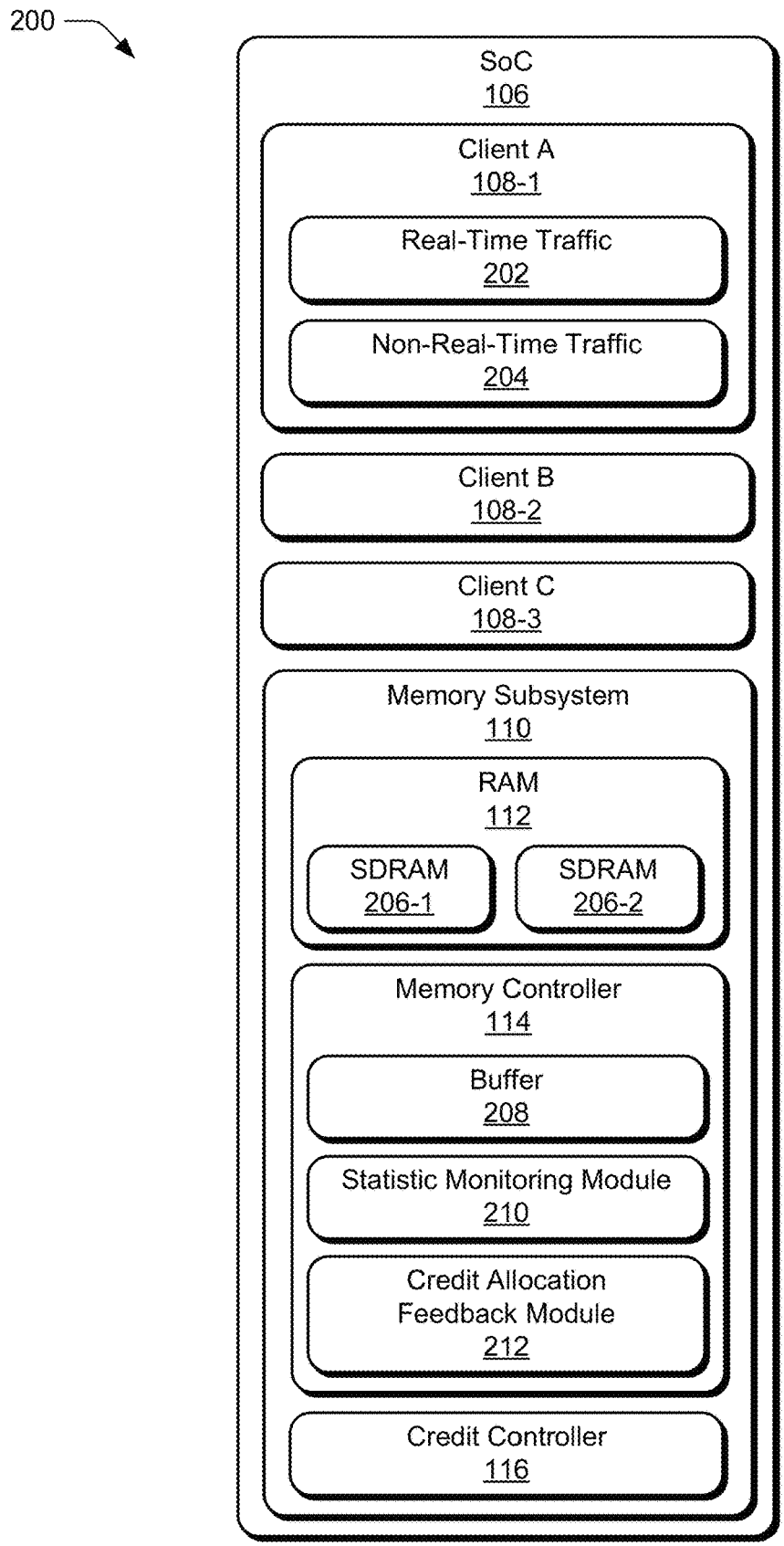
FIG. 2 illustrates an example device diagram of an SoC in which systems and techniques for modulating credit allocations in a memory subsystem of the SoC can be implemented.

FIG. 2 illustrates an example device diagram 200 of the SoC 106 in which systems and techniques for modulating credit allocations in the memory subsystem 110 of the SoC 106 can be implemented. The SoC 106 and the memory subsystem 110 can include additional components, which are not illustrated in FIG. 2.

The SoC 106 includes multiple clients 108 and the memory subsystem 110. In the depicted implementation, the clients 108 include a Client A 108-1, a Client B 108-2, and a Client C 108-3. The SoC 106 can include fewer or additional clients 108. In this example, the clients 108 are located outside the memory subsystem 110. In other implementations, the clients 108 or a portion of the clients 108 can be located in the memory subsystem 110.

As described above, the clients 108 can provide transaction requests to read or write data to the RAM 112. One or more clients 108 can provide real-time traffic 202 and non-real-time traffic 204 to the memory subsystem 110. In this example, the transaction requests of the Client A 108-1 include the real-time traffic 202 and the non-real-time traffic 204.

The memory subsystem 110 includes the RAM 112, the memory controller 114, and the credit controller 116. The RAM 112 includes at least one storage device. In the depicted implementation, the RAM 112 includes two storage devices: an SDRAM 206-1 and an SDRAM 206-2. The SDRAM 206-1 and the SDRAM 206-2 can store data for the clients 108 or data accessible by the clients 108. The SDRAM 206-1 and the SDRAM 206-2 are operably connected to the memory controller 114.

The memory controller 114 can include a buffer 208, a statistic monitoring module 210, and a credit allocation feedback module 212. The buffer 208 temporarily stores transaction requests of the clients 108. The buffer 208 or another component of the memory controller 114 can also send the transaction requests to the SDRAM 206-1 and the SDRAM 206-2 to increase bandwidth at the memory interface.

The statistic monitoring module 210 can monitor the transaction requests served to the SDRAM 206-1 and the SDRAM 206-2. For example, the statistic monitoring module 210 can determine statistics on a number of hits (e.g., page hits at the SDRAM 206-1 or the SDRAM 206-2), conflicts (e.g., the SDRAM 206-1 or the SDRAM 206-2 closing a page before opening a requested page), allocated bandwidth for the clients 108 (e.g., the traffic class assigned to the client 108 serving the transaction request), an efficiency of the transaction requests, and a desired bandwidth. The statistic monitoring module 210 can be implemented in hardware, digital logic, or a combination thereof in the memory controller 114.

The credit allocation feedback module 212 can provide feedback to the credit controller 116 or the clients 108. The feedback can provide a suggestion to module the credits allocated to one or more clients 108. For example, the credit allocation feedback module 212 can suggest that the credit controller 116 decreases the number of credits allocated to the Client B 108-2. The memory controller 114 generally does not know the number of credits allocated to a particular traffic class or VCID. As a result, the credit allocation feedback module 212 can provide, based on the statistics determined by the statistic monitoring module 210, the feedback while being agnostic to the credit allocations.

Figure 3:
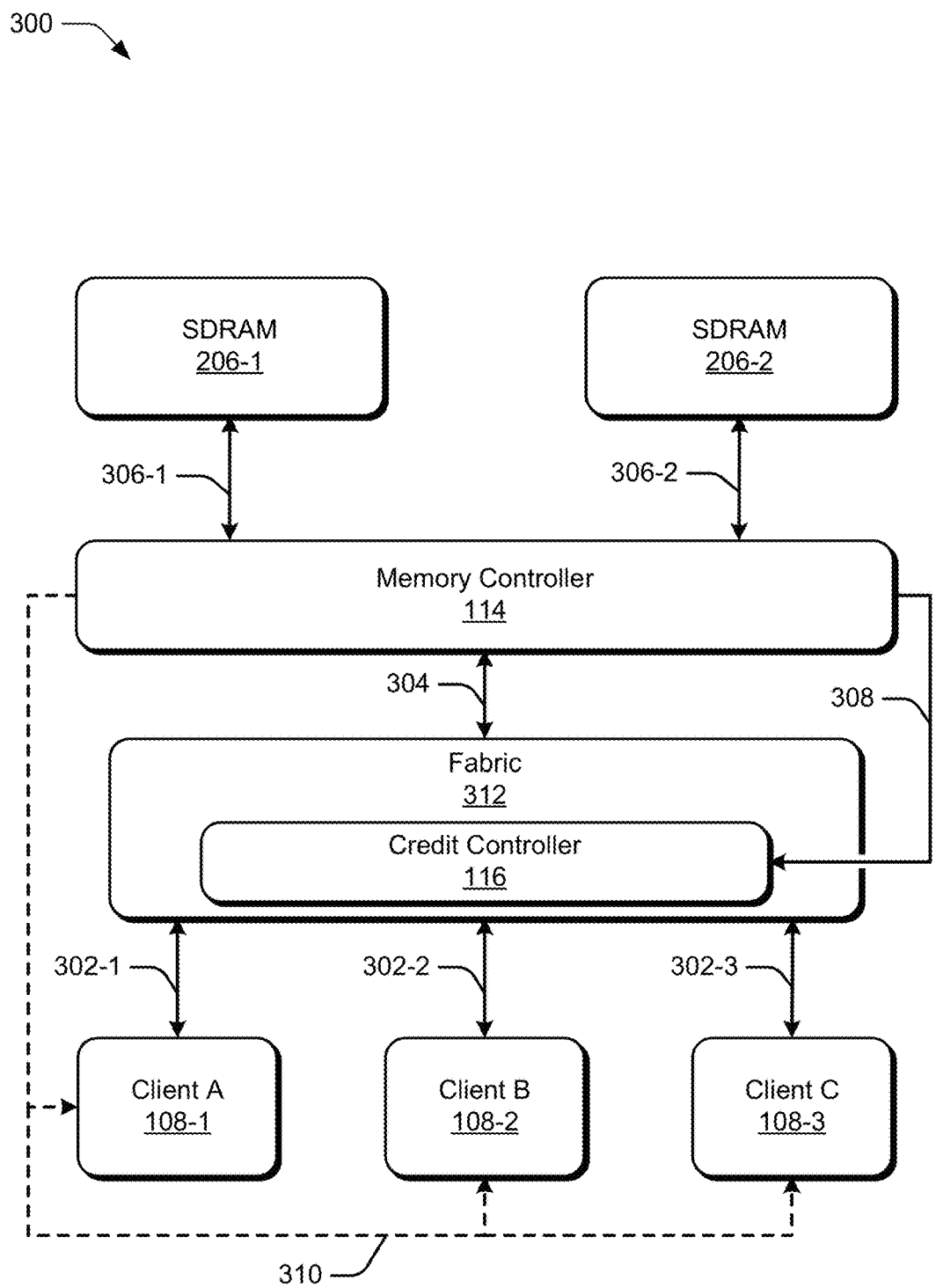
FIG. 3 illustrates an example diagram of a memory subsystem that can modulate credit allocations.

This document describes the operation of the memory subsystem 110, specifically the operations of the memory controller 114 and the credit controller 116, in greater detail with respect to FIG. 3.

Example Configurations

This section illustrates an example configuration of a hardware-based memory subsystem to module credit allocations, which may occur separately or together in whole or in part. This section describes the example configuration in relation to a drawing for ease of reading.

FIG. 3 illustrates an example diagram 300 of the memory subsystem 110 that can modulate credit allocations. The memory subsystem 110 can include additional components, which are not illustrated in FIG. 3. The memory subsystem 110 provides a hardware implementation to send feedback, based on statistics gathered by the memory controller 114, to upstream clients 108 or the credit controller 116. The feedback can suggest modulation of the number of credits allocated to a particular traffic class or a particular client. The feedback loop is completed by the clients 108, or the credit controller 116, acting on the feedback and modulating the credit allocation. In this way, the memory controller 114 can increase the performance of the memory subsystem 110.

Similar to FIG. 2, the memory subsystem 110 includes one more RAMs 112 (e.g., the SDRAM 206-1, the SDRAM 206-2), the memory controller 114, the credit controller 116, the fabric 312, and one or more clients 108 (e.g., the Client A 108-1, the Client B 108-2, the Client C 108-3). The clients 108 are operably connected to the fabric 312 via internal busses. This document refers to the internal busses as virtual channels 302. Each virtual channel 302 is assigned a unique identification, referred to as a virtual channel identification (VCID) in this document. The fabric 312, the credit controller 116, or the clients 108 can assign the VCIDs to a particular traffic class. As described above, a traffic class represents a particular treatment required for transaction requests to satisfy a particular QoS for the client 108. For example, real-time traffic 202 (e.g., from a display client) may require different QoS treatment than non-real-time traffic 204.

In the depicted implementation, the Client A 108-1 is operably connected to the fabric 312 via the virtual channel 302-1. The Client B 108-2 is operably connected to the fabric 312 via the virtual channel 302-2, and the Client C 108-3 is operably connected to the fabric 312 via the virtual channel 302-3.

The credit controller 116 can subdivide the buffer 208 (not illustrated in FIG. 3) of the memory controller 114 into credits and allocate the credits to different traffic classes to manage the bandwidth available to the different traffic classes. The credits allocated to the different traffic classes, and thus the different VCIDs, translates into a bandwidth guarantee for each VCID at the buffer 208 of the memory controller 114. In other implementations, the credit controller 116 can allocate credits among the clients 108 based on a free pool. A free pool allows the credit controller 116 to dynamically allocate credits to the clients 108 based on feedback from the memory controller 114, a traffic class assignment, a number of free credits available, or a combination thereof.

The fabric 312 is operably connected to the memory controller 114 via internal bus 304. The fabric 312 sends memory transactions from the clients 108 to the memory controller 114 via the internal bus 304. The memory controller 114 temporarily stores the transaction requests in the buffer 208.

The memory controller 114 is operably connected to the SDRAMs 206 via internal busses 306. In the depicted implementation, the memory controller 114 is operably connected to the SDRAM 206-1 and 206-2 via the internal busses 306-1 and 306-2, respectively. The memory controller 114 serves the transaction requests to the SDRAMs 206 via the respective internal busses 306. As described with respect to FIG. 2, the statistic monitoring module 210 (not illustrated in FIG. 3) monitors statistics of the memory transactions served to the SDRAMs 206.

The memory controller 114 is also operably connected to the credit controller 116 via a sideband channel 308. In some implementations, the memory controller 114 can also operably connect to one or more clients 108 via a sideband channel 310. In other implementations, the memory controller 114 can operably connect to the clients 108 via the sideband channel 310 but does not operably connect to the credit controller 116 via the sideband channel 308.

Based on the statistics generated by the statistic monitoring module 210, the credit allocation feedback module 212 (not illustrated in FIG. 3) can suggest modulating the credit allocation for one or more clients 108. In this way, the memory controller 114 can ensure that the buffer 208 is maximally efficient. If a particular VCID can achieve the same throughput with a smaller allocation of credits, then the credit controller 116 or the clients 108 can allocate the spare credits to a different VCID, traffic class, or client 108 that would benefit from additional credits.

For example, the memory controller 114 can send, via the sideband channel 308 or the sideband channel 310, at least one of the suggestion signals listed in Table 1. For example, the suggestion signals r_decrease_credits and w_decrease_credits suggest decreasing the number of credits allocated to one or more of the clients 108. In this way, the credit controller 116 or the clients 108 can use the suggestion signals to dynamically modulate a maximum occupancy of the buffer 208 for a particular VCID. In a free pool allocation system, the credit controller 116 or the clients 108 take into account the suggestion signals to modulate credit allocations among VCIDs. In modulating the credit allocations, the credit controller 116 also considers minimum credit allocations, QoS specifications, and urgency-based considerations in modulating the credits allocated to a particular VCID.

TABLE 1

| Signal name | Width | Description |
| --- | --- | --- |
| r_decrease_credits | [Num_vc-1:0] | Suggestion to decrease credits |
| r_hold_credits | [Num_vc-1:0] | Suggestion to hold credits |
| r_increase_credits | [Num_vc-1:0] | Suggestion to increase credits |
| w_decrease_credits | [Num_vc-1:0] | Suggestion to decrease credits |
| w_hold_credits | [Num_vc-1:0] | Suggestion to hold credits |
| w_increase_credits | [Num_vc-1:0] | Suggestion to increase credits |

In operation, the statistic monitoring module 210 can monitor several metrics to assist the credit allocation feedback module 212. In particular, the statistic monitoring module 210 can determine a disparity metric and an occupancy metric for transaction requests served by the memory controller 114 for each clock cycle of the memory subsystem 110. The transaction requests include the VCID or other data identifying the clients 108 that served the transaction requests. In this way, the statistic monitoring module 210 can determine the disparity metric and the occupancy metric for each of the one or more clients 108. In other implementations, the statistic monitoring module 210 can determine and monitor additional metrics. The disparity metric, which represents an efficiency seen by a particular VCID at an interface to the SDRAMs 206, is described in greater detail with respect to FIG. 4. The occupancy metric, which infers the number of credits allocated to a certain VCID, is described in greater detail with respect to FIG. 5.

As depicted in FIG. 3, the memory subsystem 110 can implement the management and modulation of credit allocations in hardware. In other implementations, the credit management and re-balancing can be implemented at the kernel level or a driver level.

Figure 4:
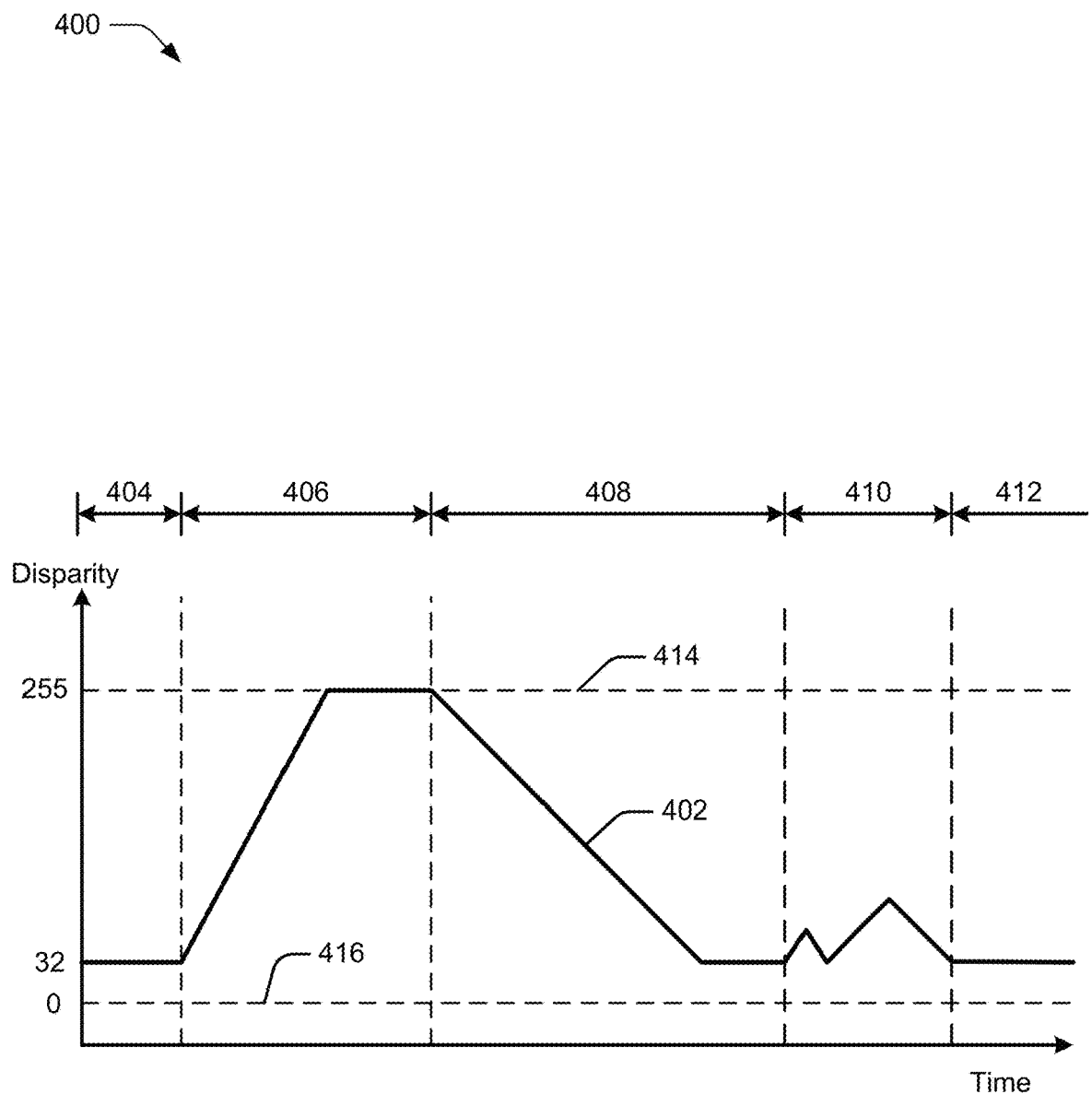
FIG. 4 illustrates an example chart illustrating a disparity metric monitored by a statistic monitoring module of a memory controller.

FIG. 4 illustrates an example chart 400 illustrating the disparity metric monitored by the statistic monitoring module 210 of the memory controller 114. In this implementation, the statistic monitoring module 210 monitors the disparity metric for a particular VCID of the memory subsystem 110.

The disparity metric represents an efficiency for a VCID at the interface to one or both of the SDRAMs 206. As an example, a VCID with transaction requests that result in a relatively large proportion of hits will have greater efficiency than a VCID with more random transaction requests leading to a higher proportion of conflicts. In this document, a hit refers to a page hit at the SDRAMs 206. A page hit can occur when a required page (e.g., row) of the SDRAM 206 for the transaction request is already open. A miss refers to a transaction request for a page that is closed at the SDRAM 206. A conflict refers to an SDRAM 206 having a different page open than required for a transaction request, resulting in the open page being closed.

A transaction request at the SDRAMs 206 generally results in a particular sequence of commands. For example, a read (RD) or write (WR) command first involves sending an activation (ACT) command. The ACT command loads an entire page of the SDRAM 206 into the row buffer. A subsequent RD command addressing a column of that page returns the data. Similarly, a subsequent WR command addressing that page writes the data in the transaction request into the addressed column. After access of that page is complete, the SDRAM 206 closes the page by issuing a precharge (PRE) command. In general, a transaction request to the SDRAMs 206 can involve opening, accessing, and closing pages. If the transaction request addresses a page or row buffer that is not currently open, the transaction request incurs an additional penalty of closing the already open page.

The memory controller 114 tries to maximize the bandwidth at the interface to the SDRAMs 206 while also simultaneously satisfying the QoS parameters for the transaction requests. These two requirements can cause the memory controller 114 to serve the transaction requests out of order. The client 108, traffic class, or VCID that sends transaction requests that result in a series of hits will have lower latency than one that experiences many conflicts. As a result, the credit allocation feedback module 212 can use statistics on hits, conflicts, allocated bandwidth, and desired bandwidth to define performance metrics. The credit allocation feedback module 212 can then use the performance metrics to suggest modulating the credits allocated to different clients 108, traffic classes, or VCIDs to improve system performance.

The statistic monitoring module 210 can define the disparity metric for a particular VCID as the sum of hits minus the sum of conflicts:

$$\text{Disparity}[VC_i] = \Sigma \text{hits} - \Sigma \text{conflicts} \quad (1)$$

The disparity metric can be an 8-bit unsigned value with some initial offset value (e.g., 32). Each time a transaction request receives a grant in a request scheduler of the memory controller 114, the statistic monitoring module 210 updates the number of hits and conflicts belonging to that VCID in the next clock cycle and updates the disparity value. In this way, the statistic monitoring module 210 can determine an efficiency associated with a particular VCID using counters while avoiding a need to use division or multiplication to generate the disparity metric. The statistic monitoring module 210 generally does not consider misses because each conflict eventually leads to a miss. In another implementation, the statistic monitoring module 210 can define the disparity metric in terms of misses instead of conflicts. The statistic monitoring module 210 can also saturate the disparity metric at a maximum value 414 (e.g., 255) and a minimum value 416 (e.g., 0) to avoid the disparity value rolling over (e.g., to avoid an integer overflow or underflow, which can cause an error in the value of the disparity metric).

The chart 400 illustrates an example disparity value 402 generated by the statistic monitoring module 210 for Client A 108-1 for time windows 404, 406, 408, 410, and 412. At the beginning of the time window 404, the disparity value 402 for the Client A 108-1 starts at an initial offset value of 32. During the time window 404, the memory controller 114 does not serve any transaction requests for the Client A 108-1, and the disparity value 402 remains at a value of 32.

During the time window 406, the memory controller 114 serves transaction requests that result in page hits, and the disparity value 402 has a positive slope. The disparity value 402 saturates at the maximum value 414 after a certain number of page hits.

During the time window 408, the statistic monitoring module 210 includes a decay factor that slowly brings the disparity value 402 back to the initial offset value when there are no transaction requests for that VCID. In this way, the statistic monitoring module 210 can avoid the hit rate of an old transaction-request thread from affecting the feedback signal for a current transaction-request thread.

During the time window 410, the disparity value 402 oscillates around the initial offset value by going below as well as above the initial offset value. The oscillation of the disparity value 402 can result from a series of transaction requests resulting in a conflict and then in a page hit. Consider after a transaction request is sent and results in a conflict, the same transaction request becomes a page hit and results in a positive score that offsets the negative score. During the time window 412, the memory controller 114 does not serve any transaction requests for the VCID, and the disparity value 402 remains at the initial offset value.

In response to a low disparity value 402, the credit allocation feedback module 212 does not necessarily suggest decreasing the credit allocation to a particular VCID. The VCID may have been assigned a small number of credits and expected a small bandwidth at the memory controller 114. As a result, relatively low efficiency or bandwidth at the interface to the SDRAM 206 is expected and does not trigger a suggestion to decrease the credits allocated to that VCID. To this end, the credit allocation feedback module 212 uses the occupancy metric, which is described with respect to FIG. 5, along with the disparity metric, to generate the credit-allocation feedback.

Figure 5:
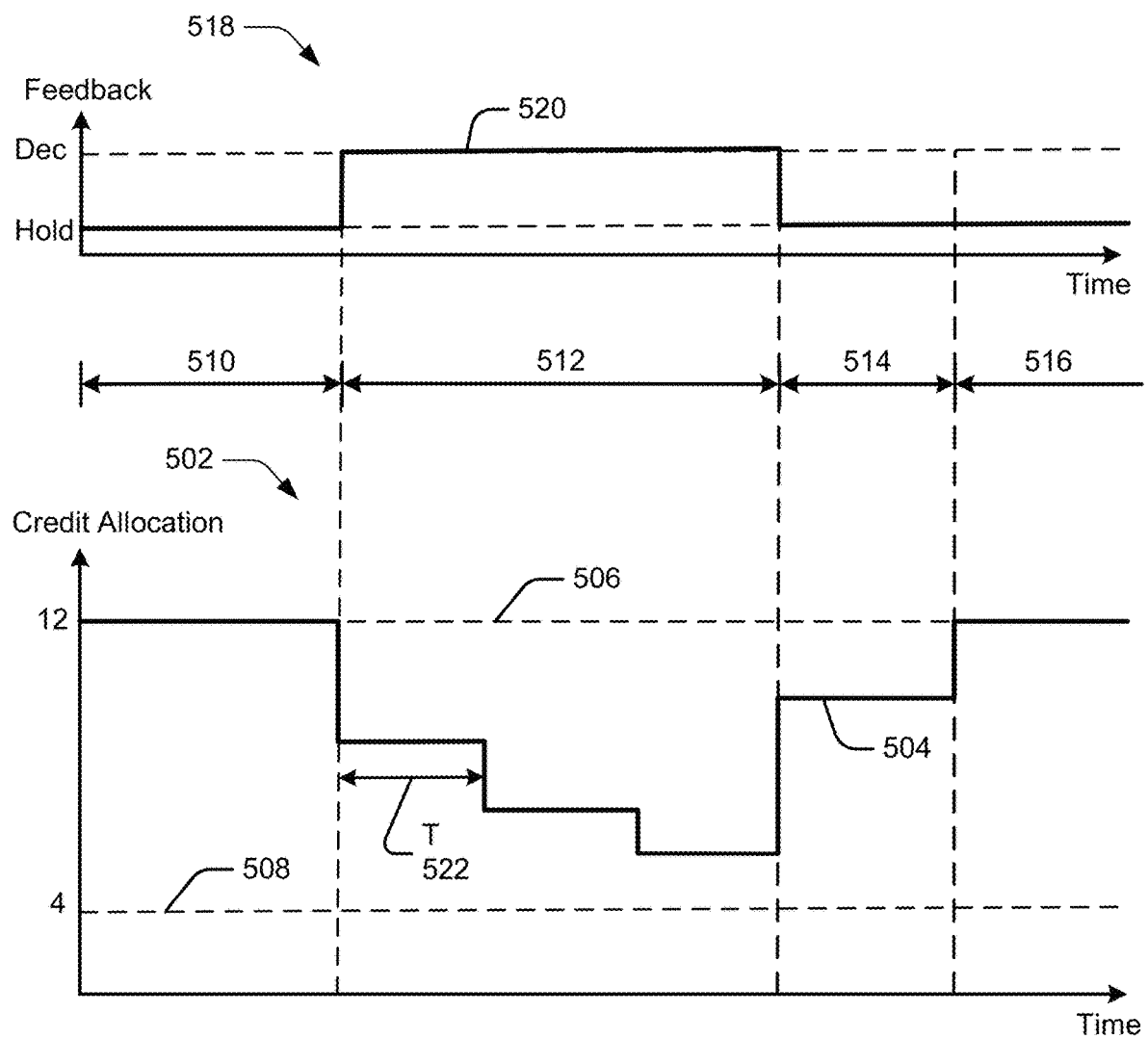
FIG. 5 illustrates an example chart illustrating credits allocated to a client based on an occupancy metric and a disparity metric and an example chart illustrating a feedback signal from a memory controller.

FIG. 5 illustrates an example chart 502 illustrating credits 504 allocated to a client 108 based on an occupancy metric and the disparity metric and an example chart 518 illustrating a feedback signal 520 from the memory controller 114. In this implementation, the statistic monitoring module 210 monitors the occupancy metric for a particular VCID of the memory subsystem 110.

As described above, the occupancy metric represents an inference by the statistics monitoring module 210 of the number of credits 504 allocated to a VCID. Because the allocation of credits is managed by the credit controller 116 and/or the one or more clients 108, the memory controller 114 does not have direct knowledge of the number of credits 504 allocated to a particular VCID. The statistics monitoring module 210 can use the number of entries in the buffer 208 used by a particular VCID to infer the credits 504 allocated to the VCID. In other words, the occupancy metric for a particular virtual channel is the number of buffer entries used by that virtual channel.

The credit allocation feedback module 212 can determine the feedback signal 520 for each VCID based on the occupancy metric and the disparity metric collected by the statistics monitoring module 210 as follows:

$$K \times \text{Occupancy}[VC_i] - \text{Disparity}[VC_i] > \text{Threshold}[VC_i], \quad (2)$$

where K is a constant scaling factor to get both the occupancy metric and the disparity metric within the same range. If the preceding is true, then the credit allocation feedback module 212 suggests that the credits 504 allocated to the VCID be decreased. The credit controller 116 and/or the client 108 can use the feedback signal 520 to perform a successive approximation of a maximum number of credits 504 to allocate to the VCID.

As an example, the chart 502 illustrates the credits 504 allocated to a particular client 108 (e.g., Client B 108-2). The chart 518 illustrates the feedback signal 520 provided by the credit allocation feedback module 212 to the credit controller 116 about suggestions for modulating the credits 504 allocated to the Client B 108-2. During the time window 510, the credit controller 116 allocated a maximum number of credits 506 (e.g., 12 credits) to the Client B 108-2. The credit allocation feedback module 212 sends a hold suggestion to the credit controller 116 for the Client B 108-2 during the time window 510.

In the time window 512, the statistics monitoring module 210 determines that the occupancy metric for the VCID associated with the Client B 108-2 is more than a threshold value larger than the disparity metric for this VCID. In response, the credit allocation feedback module 212 sends a r_decrease_credits signal to the memory controller 114. When the credit controller 116 sees the decrease suggestion for a T number of clock cycles 522, the credit controller 116 can modulate the number of credits 504 allocated to the Client B 108-2 downward by a number of credits towards a minimum number of credits 508. The decrease in the number of credits 504 allocated to the Client B 108-2 can continue until the feedback signal 520 no longer includes a r_decrease_credits suggestion. The number of credits 504 allocated to the Client B 108-2 generally will not drop below the minimum number of credits 508.

During the time windows 514 and 516, the feedback signal 520 no longer includes a r_decrease_credits suggestion for the T number of clock cycles 522, and the number of credits 504 allocated to the Client B 108-2 is increased back towards the maximum number of credits 506.

The credit controller 116 can allocate the credits taken away from the Client B 108-2 to a different client or to a free pool of credits. In this way, the memory subsystem 110 can efficiently utilize the buffer 208 of the memory controller 114 by modulating the credits allocated to different VCIDs. In addition, the credit controller generally tries to allocate the maximum number of credits 506 to the clients 108 in an absence of a decrease-credits suggestion from the memory controller 114.

Example Methods

Figure 6:
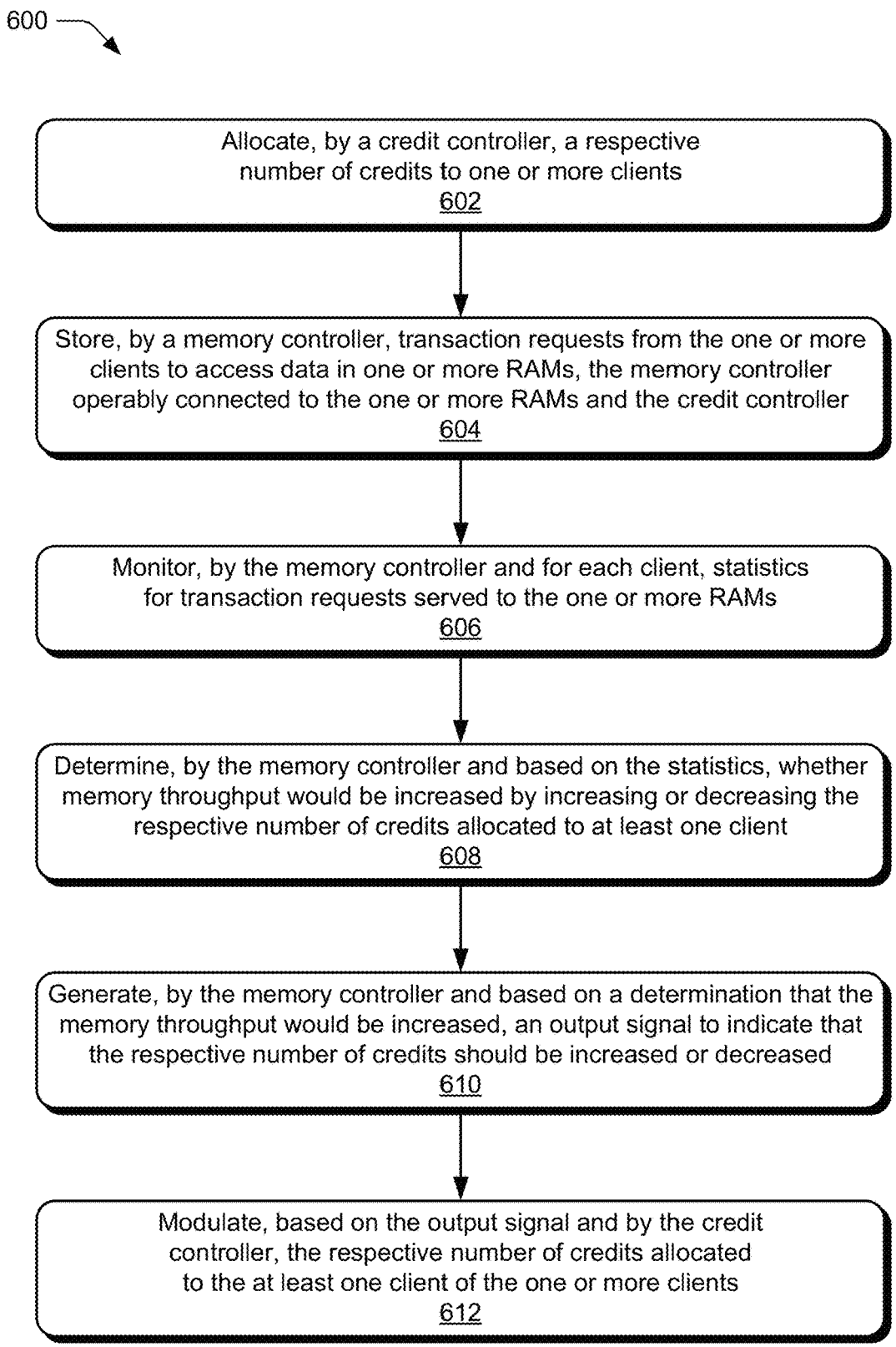
FIG. 6 is a flowchart illustrating example operations of modulating credit allocations in memory subsystems.

FIG. 6 is a flowchart illustrating example operations 600 of modulating credit allocations in memory subsystems. The operations 600 are described in the context of the memory subsystem 110 of FIGS. 1 and 2. The operations 600 may be performed in a different order or with additional or fewer operations.

At 602, a respective number of credits are allocated by a credit controller to one or more clients. For example, the credit controller 116 can allocate a respective number of credits to the one or more clients 108.

At 604, transaction requests from the one or more clients to access data in one or more RAMs are stored by a memory controller. The memory controller is operably connected to the one or more RAMs and the credit controller. For example, the memory controller 114 is operably connected to the one or more RAMs 112 (e.g., the SDRAM 206-1, the SDRAM 206-2) and the credit controller 116. The memory controller 114 includes the buffer 208 to store transaction requests, from the one or more clients 108, to access data in the one or more RAMs 112.

At 606, statistics for transaction requests served to the one or more RAMs are monitored by the memory controller for each client of the one or more clients. For example, the memory controller 114 can monitor, for each client 108 of the one or more clients 108, statistics for transaction requests served to the one or more RAMs 112.

At 608, the memory controller determines, based on the statistics, whether memory throughput would be increased by increasing or decreasing the respective number of credits allocated to at least one client of the one or more clients. For example, the memory controller 114 can determine, based on the statistics, whether memory throughput would be increased by increasing or decreasing the respective number of credits allocated to at least one client 108 of the one or more clients 108.

At 610, an output signal is generated by the memory controller to indicate that the respective number of credits should be increased or decreased. The output signal is based on a determination that the memory throughput would be increased. The output signal is sent by the memory controller to the credit controller. For example, the memory controller 114 can generate an output signal to indicate that the respective number of credits should be increased or decreased. The output signal is based on a determination that the memory throughput to the RAMs 112 would be increased. The memory controller 114 can send, via the side channel 308, the output signal to the credit controller 116. The memory controller 114 can also send the output signal directly to the at least one of the one or more clients 108.

At 612, the respective number of credit allocated to the at least one client of the one or more clients is modulated by the credit controller and based on the output signal. For example, the credit controller 116 can modulate, based on the output signal, the respective number of credits allocated to the at least one client 108 of the one or more clients 108.

Examples

In the following section, examples are provided.

Example 1: A memory subsystem of a system on chip (SoC) comprising: a memory controller operably connected to a credit controller, the memory controller comprising a buffer configured to store transaction requests, from one or more clients, to access data in one or more RAMs, the memory controller configured to: monitor, for each client of the one or more clients, statistics of the transaction requests served by the memory controller; determine, based on the statistics, whether memory throughput would be increased by increasing or decreasing a respective number of credits allocated to at least one client of the one or more clients; and generate, based on a determination that the memory throughput would be increased, an output signal, the output signal configured to indicate to a credit controller that the respective number of credits allocated to the at least one client of the one or more clients should be increased or decreased.

Example 2: The memory subsystem of example 1, wherein: the credit controller is operably connected to the one or more clients via respective virtual channels, the virtual channels associated with a respective virtual channel identification (VCID); and the memory controller is further configured to associate the statistics for each client to the respective VCID.

Example 3: The memory subsystem of any preceding example, wherein: the memory controller is further configured to send the suggestion to the credit controller via a side channel.

Example 4: The memory subsystem of any preceding example, wherein the statistics comprise at least two of a number of page hits in the one or more RAMs, a number of conflicts that require closing a page of the one or more RAMs before another page can be opened, or an inference of the respective number of credits allocated to the client.

Example 5: The memory subsystem of example 4, wherein the memory controller is further configured to: define, for each client of the one or more clients, a disparity metric that represents the number of page hits minus the number of conflicts; and define, for each client of the one or more clients, an occupancy metric that represents the inference of the respective number of credits allocated to the client, wherein the suggestion to modulate the respective number of credits allocated to the at least one client of the one or more clients is based on a comparison of the occupancy metric to the disparity metric for each client of the one or more clients.

Example 6: The memory subsystem of example 5, wherein the disparity metric comprises: a maximum threshold that represents a maximum value for the disparity metric; and a default threshold that represents an initial offset value for the disparity metric.

Example 7: The memory subsystem of example 6, wherein the disparity metric further comprises a decay factor that causes the disparity metric to regress to the default threshold after a time period without any transaction requests.

Example 8: The memory subsystem of any of examples 4 through 7, wherein the memory controller determines the occupancy metric based on a number of entries in the buffer used by each client of the one or more clients.

Example 9: The memory subsystem of any preceding example, wherein the one or more RAMs comprise low-power double data rate synchronous dynamic random access memories (LPDDR SDRAMs).

Example 10: The memory subsystem of any preceding example, wherein the memory controller comprises an application-specific integrated circuit (ASIC) memory controller.

Example 11: The memory subsystem of any preceding example, wherein the SoC is embedded in a user device.

Example 12: The memory subsystem of example 11, wherein the user device is a mobile phone, a laptop, a tablet, a portable video game console, or a wearable device.

Example 13: A credit controller, the credit controller configured to: allocate a respective number of credits to one or more clients of a memory subsystem of a system on chip (SoC), the one or more clients configured to send transaction requests to access data in one or more RAMs; receive, from the memory controller and based on statistics monitored by the memory controller, a signal indicating that the respective number of credits allocated to the one or more clients should be increased or decreased; and dynamically change, based on the signal, the respective number of credits allocated to the one or more clients.

Example 14: The credit controller of example 13, wherein: the credit controller is operably connected to the one or more clients via respective virtual channels, the virtual channels associated with a respective virtual channel identification (VCID); and the statistics monitored by the memory controller for each client of the one or more clients are associated to the respective VCID.

Example 15: The credit controller of any of examples 13 and 14, wherein the credit controller receives the suggestion, from the memory controller, via a side channel.

Example 16: A client of a system on chip (SoC), the client configured to: send, to a memory controller of a memory subsystem of the SoC, a transaction request to access data in one or more RAMs; receive, from the memory controller and based on statistics monitored by the memory controller, a signal indicating that the a number of credits allocated to the client should be increased or decreased; and dynamically change, based on the signal, the number of credits used for future transaction requests.

CONCLUSION

While various configurations and methods for modulating credit allocations in memory subsystems have been described in language specific to features and/or methods, it is to be understood that the subject of the appended claims is not necessarily limited to the specific features or methods described. Rather, the specific features and methods are disclosed as non-limiting examples of modulating credit allocations in memory subsystems.

What is claimed is:

1. A memory subsystem of a system on chip (SoC) comprising:
    a memory controller operably connected to a credit controller, the memory controller comprising a buffer configured to store transaction requests, from one or more clients, to access data in one or more random-access memories (RAMs), the memory controller configured to:
    monitor, for each client of the one or more clients, statistics of the transaction requests served by the memory controller, the statistics comprising at least two of a number of page hits in the one or more RAMs, a number of conflicts that require closing a page of the one or more RAMs before another page can be opened, or a respective number of credits allocated to the client;
    determine, based on the statistics, whether memory throughput would be increased by increasing or decreasing the respective number of credits allocated to at least one client of the one or more clients; and
    generate, based on a determination that the memory throughput would be increased, an output signal, the output signal configured to indicate to the credit controller that the respective number of credits allocated to the at least one client of the one or more clients should be increased or decreased.

2. The memory subsystem of claim 1, wherein:
    the credit controller is operably connected to the one or more clients via respective virtual channels, the virtual channels associated with a respective virtual channel identification (VCID); and
    the memory controller is further configured to associate the statistics for each client to the respective VCID.

3. The memory subsystem of claim 1, wherein:
    the memory controller is further configured to transmit the output signal to the credit controller via a side channel.

4. The memory subsystem of claim 1, wherein the memory controller is further configured to:
    define, for each client of the one or more clients, a disparity metric that represents the number of page hits minus the number of conflicts; and
    define, for each client of the one or more clients, an occupancy metric that represents the respective number of credits allocated to the client,
    wherein the output signal to modulate the respective number of credits allocated to the at least one client of the one or more clients is based on a respective comparison of the occupancy metric to the disparity metric for the one or more clients.

5. The memory subsystem of claim 4, wherein the disparity metric comprises:
    a maximum threshold that represents a maximum value for the disparity metric; and
    a default threshold that represents an initial offset value for the disparity metric.

6. The memory subsystem of claim 5, wherein the disparity metric further comprises a decay factor that causes the disparity metric to regress to the default threshold after a time period without any transaction requests.

7. The memory subsystem of claim 4, wherein the memory controller determines the occupancy metric based on a number of entries in the buffer used by each client of the one or more clients.

8. The memory subsystem of claim 1, wherein the one or more RAMs comprise low-power double data rate synchronous dynamic random-access memories (LPDDR SDRAMs).

9. The memory subsystem of claim 1, wherein the memory controller comprises an application-specific integrated circuit (ASIC) memory controller.

10. The memory subsystem of claim 1, wherein the SoC is embedded in a user device, a mobile phone, a laptop, a tablet, a portable video game console, or a wearable device.

11. A credit controller, the credit controller configured to:
    allocate a respective number of credits to one or more clients of a memory subsystem of a system on chip (SoC), the one or more clients configured to send transaction requests to a memory controller of the memory subsystem for access data in one or more RAMs of the memory subsystem, the memory controller configured to monitor statistics of the transaction requests of the one or more clients, the statistics comprising at least two of a number of page hits in the one or more RAMs, a number of conflicts that require closing a page of the one or more RAMs before another page can be opened, or a respective number of credits allocated to the client;
    receive, from the memory controller and based on the statistics monitored by the memory controller, a signal indicating that the respective number of credits allocated to the one or more clients should be increased or decreased; and
    dynamically change, based on the signal, the respective number of credits allocated to the one or more clients.

12. The credit controller of claim 11, wherein:
    the credit controller is operably connected to the one or more clients via respective virtual channels, the virtual channels associated with a respective virtual channel identification (VCID); and
    the statistics monitored by the memory controller for each client of the one or more clients are associated to the respective VCID.

13. The credit controller of claim 11, wherein the credit controller receives the signal from the memory controller via a side channel.

14. A method comprising:
    receiving, by a memory controller operably connected to a credit controller, transaction requests from one or more clients to access data of one or more random-access memories (RAMs) associated with the memory controller;

storing the transaction requests received from the one or more clients in a buffer of the memory controller;

monitoring, for each client of the one or more clients, statistics of the transaction requests received by the memory controller, the statistics comprising at least two of a number of page hits in the one or more RAMs, a number of conflicts that require closing a page of the one or more RAMs before another page can be opened, or a respective number of credits allocated to the client;

determining, based on the statistics, whether memory throughput would be increased by increasing or decreasing a respective number of credits allocated to at least one client of the one or more clients; and generating, based on a determination that the memory throughput would be increased, an output signal, the output signal configured to indicate to the credit controller that the respective number of credits allocated to the at least one client of the one or more clients should be increased or decreased.

15. The method of claim 14, wherein:

the credit controller is operably connected to the one or more clients via respective virtual channels, the virtual channels associated with a respective virtual channel identification (VCID), and the method further comprises:

associating the statistics for each client to the respective VCID of the virtual channel by which the credit controller is operably coupled to the client.

16. The method of claim 14, further comprising transmitting the output signal to the credit controller via a side channel.

17. The method of claim 14, further comprising:

defining, for each client of the one or more clients, a disparity metric that represents the number of page hits minus the number of conflicts; and defining, for each client of the one or more clients, an occupancy metric that represents the respective number of credits allocated to the client, wherein the output signal useful to modulate the respective number of credits allocated by the credit controller to the at least one client is based on a comparison of the occupancy metric to the disparity metric for the at least one client.

18. The method of claim 17, wherein the disparity metric comprises at least one of:

a maximum threshold that represents a maximum value for the disparity metric; or a default threshold that represents an initial offset value for the disparity metric.

19. The method of claim 18, wherein the disparity metric further comprises a decay factor that causes the disparity metric to regress to the default threshold after a time period without any transaction requests.

20. The method of claim 17, further comprising determining the occupancy metric based on a number of entries in the buffer used by each client of the one or more clients.

* * * * *